(12) United States Patent
Kawai

(10) Patent No.: US 8,150,329 B2
(45) Date of Patent: Apr. 3, 2012

(54) WIRELESS COMMUNICATION DEVICE AND METHOD FOR SWITCHING MODULATION SYSTEM THEREOF

(75) Inventor: Masahiro Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 12/308,667

(22) PCT Filed: Jun. 22, 2007

(86) PCT No.: PCT/JP2007/062584
§ 371 (c)(1), (2), (4) Date: Dec. 19, 2008

(87) PCT Pub. No.: WO2007/148784
PCT Pub. Date: Dec. 27, 2007

(65) Prior Publication Data
US 2010/0240313 A1    Sep. 23, 2010

(30) Foreign Application Priority Data
Jun. 23, 2006    (JP) ................................ 2006-173807

(51) Int. Cl.
*H04B 17/00*    (2006.01)
(52) U.S. Cl. .................... 455/67.11; 455/63.1
(58) Field of Classification Search .............. None
See application file for complete search history.

(56) References Cited

U.S. PATENT DOCUMENTS

| | | | |
|---|---|---|---|
| 6,128,476 A | 10/2000 | Fujita | |
| 6,879,626 B1 | 4/2005 | Sudo | |
| 6,985,749 B2 | 1/2006 | Bannasch et al. | |
| 7,047,016 B2 | 5/2006 | Walton et al. | |
| 7,184,743 B2 | 2/2007 | Walton et al. | |
| 7,613,460 B2 | 11/2009 | Matsui et al. | |
| 7,945,280 B2* | 5/2011 | Furukawa et al. | 455/522 |
| 2003/0053549 A1 | 3/2003 | Uesugi | |
| 2005/0213674 A1* | 9/2005 | Kobayashi | 375/259 |
| 2006/0094460 A1* | 5/2006 | Tiedemann et al. | 455/522 |
| 2007/0147485 A1* | 6/2007 | Sakamoto et al. | 375/219 |

FOREIGN PATENT DOCUMENTS

| | | |
|---|---|---|
| CN | 1682565 A | 10/2005 |
| EP | 0823790 A2 | 2/1998 |
| EP | 1551179 A1 | 7/2005 |
| JP | 2000-261398 A | 9/2000 |
| JP | 2000-324081 A | 11/2000 |
| JP | 2002-261851 A | 9/2002 |
| JP | 2003-198426 A | 7/2003 |

(Continued)

*Primary Examiner* — An Luu
(74) *Attorney, Agent, or Firm* — Foley & Lardner LLP

(57) ABSTRACT

A further secure channel is ensured after switching of a modulation system at the time of deterioration channel quality. A wireless communication device includes a transmitter that converts data into a modulation wave in a set modulation system and transmits the modulation wave, a receiver that receives a transmitted modulation wave, and converts the modulation wave into original data based on a set modulation system, a determining means for determining quality of a channel on the basis of a signal received by the receiver, and a modulation system switching means for switching the modulation system to a modulation system that is strongest against external disturbance among a plurality of different modulation systems set in advance and then switching the modulation system to a modulation system in accordance with quality of the channel, when the determining means determines that quality of the channel is deteriorated.

15 Claims, 3 Drawing Sheets

FOREIGN PATENT DOCUMENTS

| | | |
|---|---|---|
| JP | 2003-198651 A | 7/2003 |
| JP | 2005-012684 A | 1/2005 |
| JP | 2005-094605 A | 4/2005 |
| JP | 2005-318533 A | 11/2005 |
| JP | 2005-354325 A | 12/2005 |
| JP | 2006-033309 A | 2/2006 |
| RU | 2002-116686 A | 2/2004 |
| RU | 2251211 C2 | 4/2005 |
| RU | 2003-136164 A | 5/2005 |
| WO | WO 99/45654 A1 | 9/1999 |
| WO | WO 01/47203 A2 | 6/2001 |
| WO | WO 02/093782 A1 | 11/2002 |

* cited by examiner

WIRELESS COMMUNICATION DEVICE AND METHOD FOR SWITCHING MODULATION SYSTEM THEREOF

This application is the National Phase of PCT/JP2007/062584, filed Jun. 22, 2007, which claims priority to Japanese Application No. 2006-173807, filed Jun. 23, 2006, the disclosures of which are hereby incorporated by reference in their entirety.

TECHNICAL FIELD

Incorporation by Reference

This present application is based upon and claims the benefit of priority from Japanese patent application No. 2006-173807, filed on Jun. 23, 2006, the disclosure of which is incorporated herein in its entirety by reference.

TECHNICAL FIELD

The present invention relates to a wireless communication device and a method for switching a modulation system thereof, and in particular, to a method of selecting and switching a modulation system of a wireless communication device in accordance with quality of a channel.

BACKGROUND ART

In digital wireless communication using a multi-level modulation system, as a modulation multi-level number becomes large, an information transmission amount per unit frequency becomes large, although communication becomes weak against disturbance in a channel. When quality of a channel becomes lower than a certain level, the number of transmission errors is increased, and communication is cut off sooner or later. There has been a request for securing communication of a minimum level even in such a case. In view of the above, there has been considered a communication system using an adaptive modulation method. In this method, a channel is monitored, and when deterioration in quality of the channel is detected, a modulation multi-level number is lowered to secure communication of good quality at a bit rate of a minimum level, and when quality of the channel is excellent, the modulation multi-level number is increased to enable communication of large capacity.

For example, in a system described in Patent Document 1, the system carries out control of selecting a modulation system that can maintain communication quality of a certain level from modulation systems that can be used in accordance with a state of a channel at a certain time point. For example, incase there are three multi-level modulation systems, which are 64 QAM (quadrature amplitude modulation), 16 QAM, and QPSK (quadrature phase shift keying), and when quality of a channel begins to be deteriorated, switching is made from 64QAM to 16QAM first, and if deterioration progresses further, switching is made from 16 QAM to QPSK.
Patent Document 1: JP2005-012684A

DISCLOSURE OF THE INVENTION

Problems to be Solved by the Invention

As described above, in an adaptive modulation in which a modulation system in a highest bit rate that can secure quality of a certain level is selected from a plurality of modulation systems, when it is determined that quality of a certain level cannot be maintained, quality of communication is secured by changing a modulation system to one in a lower bit rate. Incase quality of a channel is deteriorated further, the modulation system is changed to a modulation system in a further lower bit rate. In general, the lower a bit rate, the lower an S/N ratio required for securing quality of communication can be. Therefore, even when a channel is in a state where required quality of communication cannot be secured in a modulation system in a high bit rate, communication of highest quality possible in such a state can be secured by changing modulation systems in accordance with states of the channel.

Here, when a state of a channel is deteriorating and a modulation system is to be changed, change of the modulation system needs to be arranged in advance between a transmission device and a receiving device. Accordingly, a certain period of time is required from when quality of the channel is changed until when the modulation system is actually changed. For the above reason, in case deterioration occurs in quality of the channel due to fading and raining and the modulation system is changed, depending on speed of change in the deterioration of quality of the channel, modulation at the receiving device is not carried out properly since deterioration of the channel is further progressed at the time when the change of the modulation system is completed. Accordingly, there is considered a case where a state in which communication cannot be secured is continued although the modulation system is switched for the purpose of securing communication at a minimum level.

The present invention has been made in view of the above conventional circumstances. An object of the present invention is to secure a channel further securely after switching of a modulation system at the time of deterioration of channel quality.

Means for Solving the Problems

In order to achieve the above object, a wireless communication device according to the present invention is characterized by including: a transmitter that converts data into a modulation wave in a set modulation system and transmits the modulation wave; a receiver that receives a transmitted modulation wave, and converts the modulation wave into original data based on a set modulation system; a determining means for determining quality of a channel on the basis of a signal received by the receiver; and a modulation system switching means for switching the modulation system to a modulation system that is strongest against external disturbance among a plurality of different modulation systems set in advance and then switching the modulation system to a modulation system in accordance with quality of the channel, when the determining means determines that quality of the channel is deteriorated.

A modulation system switching method according to the present invention is a modulation system switching method of a wireless communication device that includes a transmitter that converts data into a modulation wave in a set modulation system and transmits the modulation wave, and a receiver that receives a transmitted modulation wave, and converts the modulation wave into original data based on a set modulation system, and the modulation system switching method is characterized by including: a determining step of determining quality of a channel on the basis of a signal received by the receiver; and a modulation system switching step of switching the modulation system to a modulation system that is strongest against external disturbance among a plurality of different modulation systems set in advance and then switching the modulation system to a modulation system in accordance with quality of the channel, when quality of the channel is determined to be deteriorated.

ADVANTAGES OF THE INVENTION

According to the present invention, a further secure channel can be ensured after switching of a modulation system at the time of deterioration of channel quality.

EXPLANATION OF REFERENCE SYMBOLS 1a, 1b: Transmitter
2a, 2b: Receiver
3a, 3b: Receiving quality determination circuit
4a, 4b: Modulation system control section
5a, 5b: Antenna
100, 200: Wireless communication device

BEST MODE FOR CARRYING OUT THE INVENTION

Next, detailed description of examples of a wireless communication device and a method for switching a modulation system thereof according to the present invention will be made with reference to the accompanying drawings.

Figure 1:
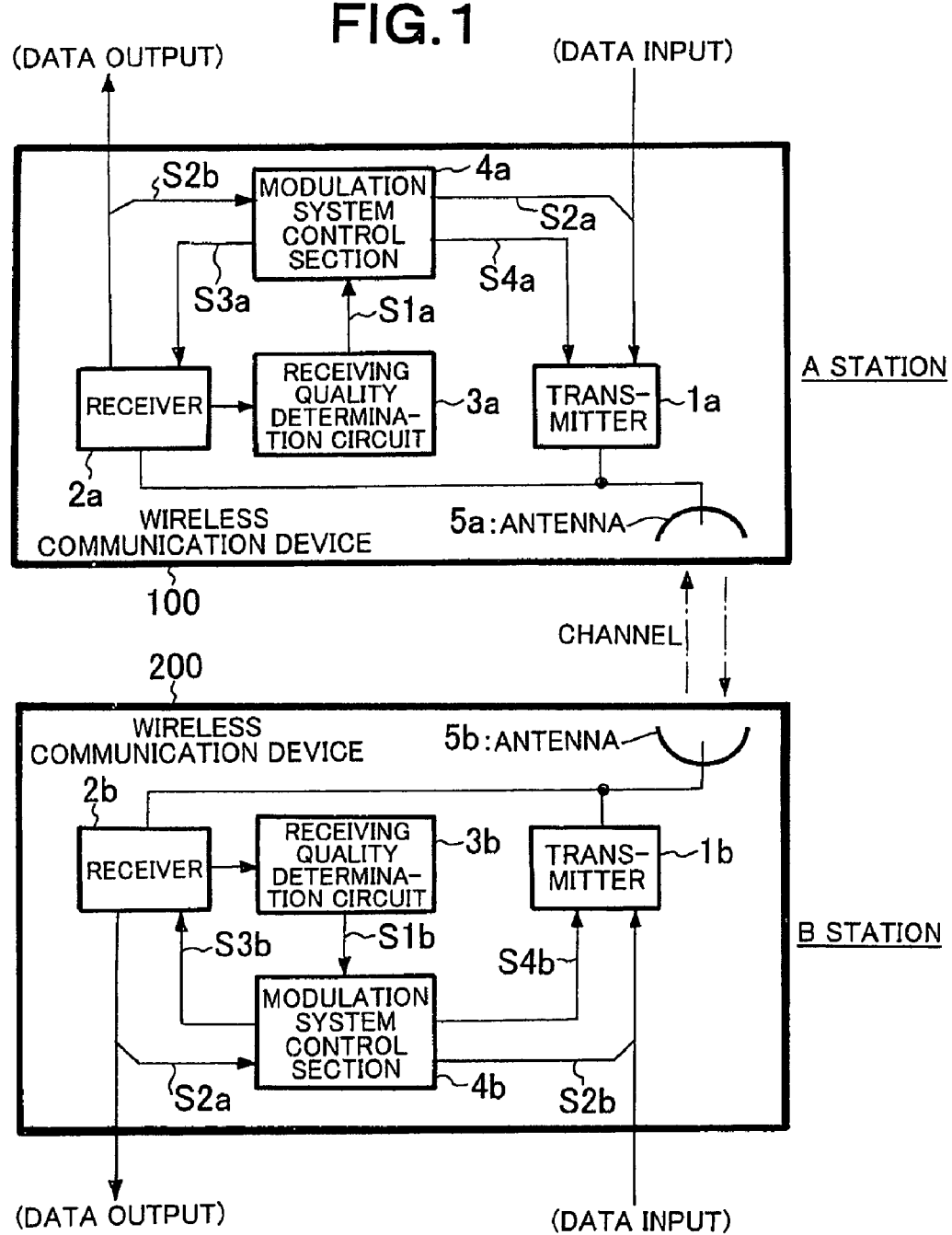
FIG. 1 is a block diagram showing an entire configuration of a digital wireless communication system according to an example of the present invention.

FIG. 1 shows a configuration of a present example. A digital wireless communication system according to the present example shown in FIG. 1 includes a wireless communication device 100 that constitutes an A station and a wireless communication device 200 that constitutes a B station that are arranged in a manner facing each other. The wireless communication device 100 and the wireless communication device 200 carry out communication with each other interactively. The wireless communication device 100 of the A station and the wireless communication device 200 of the B station respectively include transmitters 1a and 1b, receivers 2a and 2b, receiving quality determination circuits (constitute a determining means of the present invention) 3a and 3b, modulation system control sections (constitute a modulation system switching means of the present invention) 4a and 4b, and antennas 5a and 5b.

In the above configuration, when data is transmitted from the A station to the B station, data (information) input to the wireless communication device 100 of the A station is converted to a modulation wave of a quadrature-amplitude modulation (QAM) system by the transmitter 1a, and supplied to the antenna 5a. A radio wave corresponding to the modulation wave output from the antenna 5a propagates through air, and received by the antenna 5b in the opposed wireless communication device 200 of the B station. The modulation wave received by the antenna 5b is supplied to the receiver 2b and demodulated, and the transmitted data is reproduced and output. In a similar manner as above, in data transmission from the B station to the A station, data is transmitted through a route of the transmitter 1b, the antenna 5b, the antenna 5a, and the receiver 2a in this order.

In the present example, the receivers 2a and 2b are connected to the receiving quality determination circuits 3a and 3b that determine quality of a channel based on information (described later) of a receiving signal transmitted to the inside thereof. The receiving quality determination circuits 3a and 3b constantly monitor communication quality on the basis of the receiving signal, select a modulation system appropriate for communication quality at a certain time, and send instruction signals S1a and S1b to the modulation system control sections 4a and 4b.

The modulation system control sections 4a and 4b carry out control of changing a receiving modulation system of the own station and a transmission modulation system of an opposite station on the basis of the modulation system selected by the receiving quality determination circuits 3a and 3b. The modulation system control sections 4a and 4b generate control signals S2a to S4a and S2b to S4b for changing the modulation system based on the sent instruction signals S1a and S1b, and send the control signals to the receivers 2a and 2b of the own station and the transmitters 1a and 1b of the opposite station.

Figure 2:
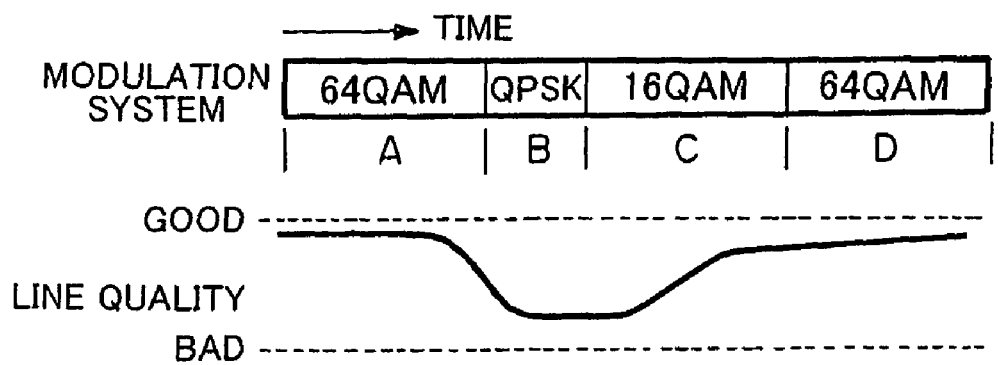
FIG. 2 is a view for explaining operation of the example.

Next, with reference to FIGS. 2 and 3, operation of the present example will be described.

Here, modulation systems used in the present example are assumed to be three types, which are QPSK, 16 QAM, and 64 QAM. A plurality of different modulation systems applied to the present invention are not limited to these systems and may be other modulation systems. FIG. 2 shows a relationship in time between line quality and the modulation systems in the present example.

First, information of a receiving signal that reflects quality of a channel is input from the receiver 2a to the receiving quality determination circuits 3a and 3b. The receiving quality determination circuits 3a and 3b estimate quality of the channel based on the information of the input receiving signal to determine whether transmitted data maintains quality of a certain level. Channel quality can be determined based on, for example, information about an error rate of receiving data, distribution of receiving signal points, and the like. In the present example, description will be made on a method of determining a state of a channel based on distribution of receiving signal points.

Figure 3A:
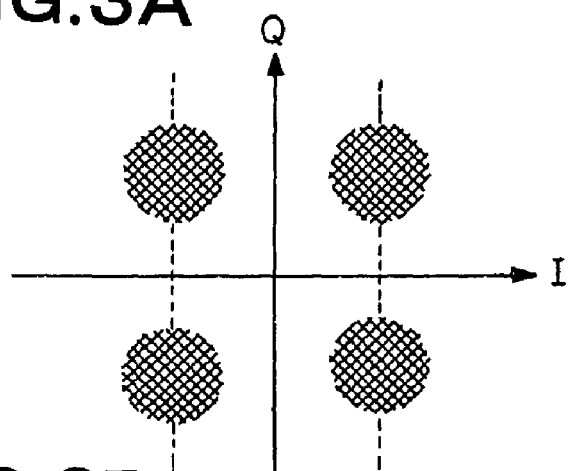
FIG. 3A is a constellation diagram showing receiving signal points of QPSK in the example and FIG. 3B is a graph showing distribution of the receiving signal points in an I-axis direction.
Figure 3B:
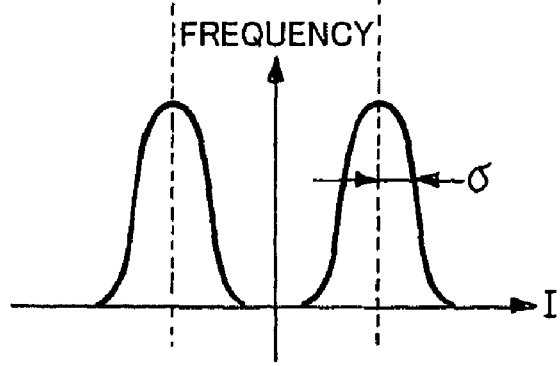

FIGS. 3A and 3B show receiving signal points in a constellation in QPSK as an example. FIG. 3A shows receiving signal points in QPSK at a receiver. FIG. 3B shows distribution of the receiving signal points in an I-axis direction. When thermal noise is considered, this distribution is expressed in Gaussian distribution. By measuring distribution of the receiving signals, a standard deviation σ showing how the distribution is spread can be obtained. An S/N ratio at a receiver can be found based on the standard deviation σ, and a relationship between an S/N ratio and an error rate is determined according to a modulation system. For the above reason, by obtaining the standard deviation σ, channel quality can be measured.

Here, consideration will be made with respect to a situation (refer to a section A in FIG. 2) where channel quality is sufficiently well stabilized. In this case, the receiving quality determination circuits 3a and 3b estimate quality of the channel based on information of an input receiving signal (for example, distribution of receiving signal points), and determine that sufficient quality will be maintained if a modulation system of a high multi-level number is selected. Then, the receiving quality determination circuits 3a and 3b send the instruction signals S1a and S1b to the modulation system control sections 4a and 4b. The modulation system control sections 4a and 4b generate the control signals S2a to S4a and S2b to S4b on the basis of the instruction signals S1a and S1b, and send the control signals to the receivers 2a and 2b of the own stations and the transmitters 1a and 1b of opposite stations. In this manner, the receivers 2a and 2b of the own stations set a modulation system (64QAM in the present example) of a large multiple value number based on the control signals S3a and S3b. In addition, the transmitters 1a and 1b of the opposite stations set a modulation system (64QAM in the present example) of a large multiple value number based on the control signals S4a and S4b. A situation here corresponds to the section A in the example in FIG. 2.

On the other hand, consideration will be made with respect to a situation (refer to the right end of the section A in FIG. 2) where quality of the channel starts to be gradually deteriorated from the state described above due to raining or fading. In this case, the receiving quality determination circuits 3a and 3b estimate quality of the channel based on the information (for example, distribution of receiving signal points) of the input receiving signal to determine whether transmitted data maintains quality of a certain level. As a result, the receiving quality determination circuits 3a and 3b determine that quality of a certain level cannot be maintained in a current modulation system due to deterioration of the channel. Then, the receiving quality determination circuits 3a and 3b send instruction signals S1a and S1b to the modulation system control sections 4a and 4b in order to change the modulation system to a system (QPSK in the present example) that is robust against external disturbance, that is, a robust system.

Here, a case in which quality of a channel from the A station to the B station is deteriorated is assumed. In this case, the modulation system control section 4b of the B station generates the control signals S2b and S3b for switching the modulation system to a robust system (QPSK) on the basis of the instruction signal S1 from the modulation system control section 4b. Then, the modulation system control section 4b sends the control signal S3b to the receiver 2b of the own station, and also sends the control signal S2b to the modulation system control section 4a of the A station through the transmitter 1b of the own station and the receiver 2a of the A station, in order to notify the modulation system that the current modulation system is to be changed to. After the above, the receiver 2b of the B station switches the modulation system from 64QAM to the robust system (QPSK) based on the control signal S3b. Also, when the modulation system control section 4a of the A station receives the control signal S2b for changing the modulation system from the B station, the modulation system control section 4a generates the control signal S4a by which the modulation system (QPSK) that is the same as that of the B station is set to the transmitter 1a of the A station. A situation here corresponds to a section B in the example in FIG. 2.

After changing the modulation system as described above, the receiving quality determination circuit 3b of the B station determines receiving quality in the modulation system (QPSK) again. As a result, in case the receiving quality determination circuit 3b determines that sufficient quality can be maintained even if a multi-level number is increased, the receiving quality determination circuit 3b sends the instruction signal S1b for changing the modulation system from the robust system to a system (16 QAM in the present example) in which a multi-level number is increased to the modulation system control section 4b. After the above, in similar operation as described above, the modulation system control section 4b generates the control signals S2b and S3b for switching the modulation system to a robust system (16 QAM) on the basis of the instruction signal S1b. Then, the modulation system control section 4b sends the control signal S3b to the receiver 2b of the own station, and also sends the control signal S2b to the modulation system control section 4a of the A station through the transmitter 1b of the own station and the receiver 2a of the A station, in order to notify the modulation system that the current modulation system is to be changed to. Thereafter, the receiver 2b of the B station switches the modulation system from QPSK to 16 QAM based on the control signal S3b. Also, when the modulation system control section 4a of the A station receives the control signal S2b for changing the modulation system from the B station, the modulation system control section 4a generates the control signal S4a by which 16 QAM that is the same as the modulation system of the B station is set to the transmitter 1a of the A station. A situation here corresponds to a section C in the example in FIG. 2.

Consideration will be made with respect to a case where time has further elapsed and a state of the channel has been improved. In this case, the receiving quality determination circuit 3b of the B station determines receiving quality in the modulation system (16 QAM) again. As a result, in case the receiving quality determination circuit 3b determines that quality will be maintained in 64 QAM where a multi-level number is increased, the receiving quality determination circuit 3b sends the instruction signal S1 for changing the modulation system from 16 QAM to 64 QAM to the modulation system control section 4b. After the above, in similar operation as described above, the modulation system control section 4b generates the control signals S2b and S3b for switching the modulation system from 16 QAM to 64 QAM on the basis of the instruction signal S1b. Then, the modulation system control section 4b sends the control signal S3b to the receiver 2b of the own station, and also sends the control signal S2b to the modulation system control section 4a of the A station through the transmitter 1b of the own station and the receiver 2a of the A station, in order to notify the modulation system that the current modulation system is to be changed to. After the above, the receiver 2b of the B station switches the modulation system from 16 QAM to 64 QAM based on the control signal S3b. Also, when the modulation system control section 4a of the A station receives the control signal S2b for changing the modulation system from the B station, the modulation system control section 4a generates the control signal S4a by which 64 QAM that is the same as the modulation system of the B station is set to the transmitter 1a of the A station. A situation here corresponds to a section D in the example in FIG. 2.

As described above, in the present example, when quality of a channel is beginning to deteriorate, a modulation system is first changed to a robust modulation system that is strongest against external disturbance among modulation systems that can be used. After that, that quality of a certain level can be maintained in a target modulation system, is confirmed, and then the modulation system is changed to the target modulation system.

Here, when quality of a channel is beginning to deteriorate, how far the deterioration will progress is unknown at this time point. Therefore, even if deterioration is detected and a modulation system is switched to a modulation system that is one rank below, there can be considered a case where the deterioration in quality of the channel has already progressed at the time when the switching is completed that sufficient quality cannot be maintained even in the modulation system one rank below. In the example of FIG. 2, this corresponds to a case where a modulation system is switched from 64 QAM to 16 QAM which is a modulation system one rank below, in place of QPSK which is the robust modulation system. Switching control of Patent Document 1 described above is also similar to this. In addition, there can be also considered a case where deterioration progresses as much as that resynchronization at a receiver is impossible in the modulation system after the change. When the above cases take place, communication is cut off for a long period of time until the channel is recovered.

In order to avoid the above problem, in the present example, when beginning of deterioration in quality of a channel is detected, the current modulation system is once unconditionally changed to a robust modulation system among modulation systems that can be used, and quality of the channel is monitored in a mode of the modulation system. While in this mode, a channel of a minimum level is secured. As a result of the monitoring, for example, in case a modulation system one rank below the original modulation system is found out to be able to maintain quality of transmission, the modulation system is switched again to the modulation system one rank below the original modulation system. In this manner, even if significant deterioration in quality of transmission occurs in a short period of time, communication can be secured for a longer period of time.

That is, the present example adopts a procedure that, in the digital wireless communication system using an adaptive modulation system, in case a modulation system is selected from among three or more types of modulation systems in accordance with quality of a channel, and when quality of the channel is deteriorated and a current modulation system is changed to another modulation system, the current modulation system is once unconditionally switched to a modulation system that is strongest against disturbance among modulation systems that can be used, quality of the channel is redetermined in this state, and then the modulation system is switched to a target modulation system. In this manner, a further stabilized channel can be secured after a modulation system is switched.

Next, description will be made with respect to an advantageous effect of the present example.

In case QAM system is used, there are considered a variety of modulation systems of multi-level numbers, such as 4 QAM (QPSK), 16 QAM, 32 QAM, 64 QAM, 128 QAM, 256 QAM, and the like. The larger the multi-level number, the more an information amount that can be transmitted per unit frequency. However, since intervals between signal points become narrower, transmission errors easily occur due to worse convergence of signal points caused by noise and interference generated in a channel.

In addition, in the digital wireless communication system using a multi-level QAM system, generally, a demodulator needs to establish carrier synchronization and clock synchronization. However, as a multi-level number becomes large, reestablishment of carrier synchronization and clock synchronization generally becomes difficult in case disturbance occurs in a channel. For example, in case of carrier synchronization, for multi-level QAM constellations, there is a method of establishing synchronization based on error information showing how far and in what direction received signal points are apart from ideal positions. In this method, since intervals between signal points become narrower as a multi-level number becomes large, there is high possibility that receiving signal points influenced by disturbance enter areas that belong to adjacent signal points. In this case, since wrong error information is output, reestablishment of synchronization becomes difficult, or takes a long period of time. Conversely, intervals between signal points are wide in a modulation system with a small modulation multi-level number. Accordingly, even in a state where disturbance occurs in a channel and that causes a problem on communication quality if a modulation system with a large multi-level number is used, synchronization can be established comparatively easily in the modulation system with a small modulation multi-level number and a channel can be secured.

In an adaptive modulation system, modulation systems of both a transmitting side and a receiving side need to be changed. Accordingly, switching of a modulation system normally needs to be arranged in advance before the modulation system is switched. Such arrangement is carried out in communication with an opposite station. For this reason, a certain period of time is required from when switching becomes necessary until when the switching is actually carried out. Therefore, there can be considered a situation where deterioration of a channel further progresses during the arrangement, and sufficient quality is not secured in a modulation system after switching or resynchronization cannot be established.

With respect to the above point, in the present example, in order to handle the above situation as much as possible, a current modulation system is switched to a robust modulation system against disturbance among modulation systems that can be used when quality of a channel begins to be deteriorated. In this manner, after switching of a modulation system at the time channel quality is deteriorated, further secure channel can be ensured.

Therefore, for the reasons described above, in the wireless communication using an adaptive modulation system, when the channel quality is deteriorated and a modulation system is to be changed, the modulation system is once changed to a robust modulation system among modulation systems that can be selected and a secure channel is ensured. Then, a state of the channel is checked again and switching is made to a target modulation system. In this manner, influence from temporal change of disturbance can be restricted, and also line cut off time due to failure in switching a modulation system can be restricted.

Modified Example

In the above example, description is made with respect to a case where a modulation multi-level number is used as an element that determines strength against disturbance in a channel. However, the present invention is not limited thereto, and, for example, a transmission band, that is, a symbol frequency (symbol rate), can also be an element that determines strength against disturbance in a channel.

Figure 5:
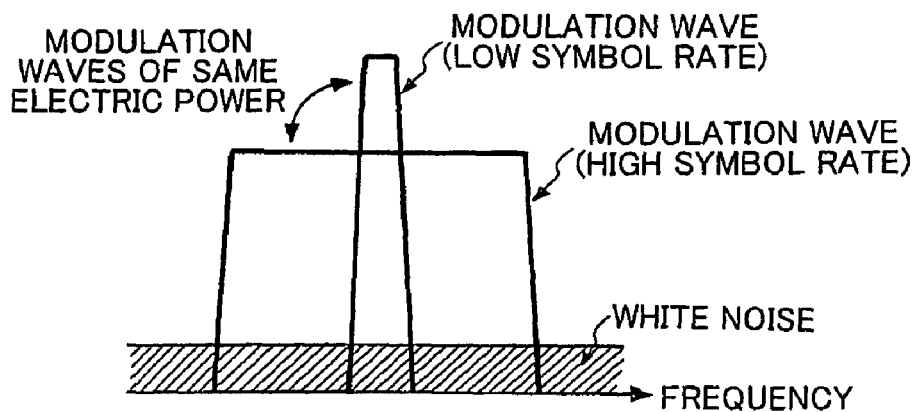
FIG. 5 is a graph for explaining a frequency characteristic in case of frequency selective fading.

For example, in case of S/N deterioration due to lowering of a receiving field, noise spreads in a wide band in a uniform manner. However, with respect to a signal component, as a band becomes narrower, a power density per unit frequency increases, when electric power is the same. Accordingly, an S/N ratio improves. This state is shown in FIG. 5. As shown in FIG. 5, in case of a wide band, band of noise that has influence on transmission information is also wide. Accordingly, an S/N ratio becomes worse. Also, in case of a narrow band, not only that a power density per unit frequency of transmission information increases, but also an amount of noise that has influence on the transmission information is small since a band thereof is narrow. Accordingly, an S/N ratio becomes excellent.

Figure 4A:
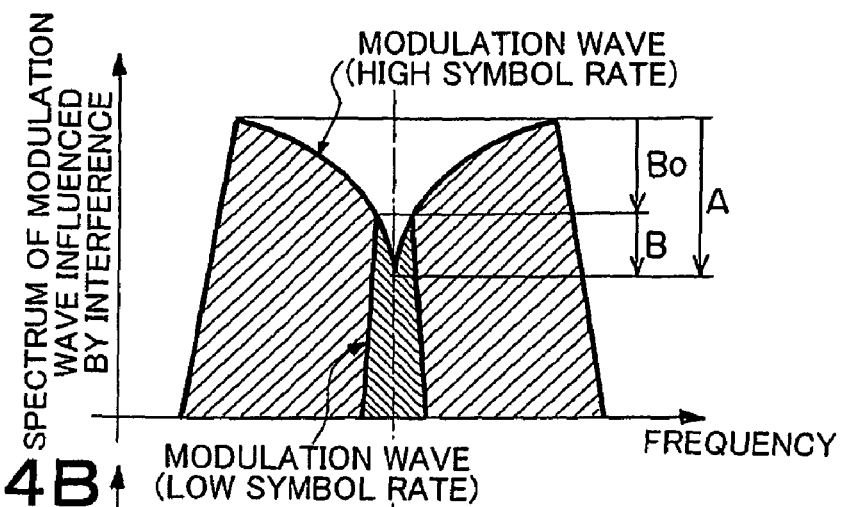
FIG. 4A is a graph showing spectrum of a modulation wave receiving interference in a modified example of the present invention and FIG. 4B is a graph for explaining a frequency characteristic of fading.
Figure 4B:
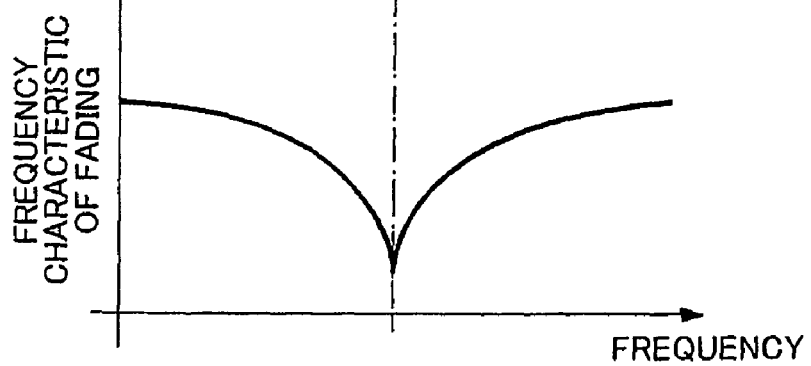

In addition, in case of frequency selective fading, when a delay difference and a phase difference between an interference wave and a principal wave are determined, a shape of a notch type frequency characteristic (FIG. 4B shows a frequency characteristic of an amplitude) is determined by frequencies and fading as shown in FIG. 4B. At this time, as shown in FIG. 4A, incase two modulation waves having different transmission bands (symbol rates) are considered, a modulation wave having a relatively large symbol rate and a wide band receives a notch depth of A, while a modulation wave having a relatively small symbol rate and a narrow band can be considered to receive influence of a level fluctuation of B0 and a notch depth of B. That is, as a transmission band become narrower, an effective notch depth becomes shallower. Since an inter symbol interference amount caused by fading becomes smaller as much as a notch becomes shallower, dispersion of receiving signal points is restricted to be small, which is advantageous for resynchronization after switching of a modulation system.

Therefore, not only a modulation multi-level number described above, but also narrowing a transmission band is a method that is effective for securing a steady channel. When a state of a channel begins to be deteriorated, a line cut off time due to failure of switching can be restricted to be short also by selecting a modulation system having a small modulation multi-level number and a narrower transmission band.

As described above, the modulation system control section (modulation system switching means) may switch a modulation system to a modulation system with a smallest modulation multi-level number, a modulation system with a narrowest transmission band, or a modulation system with a smallest modulation multi-level number and a narrowest transmission band, as a modulation system that is strongest against external disturbance. Also, the modulation system control section may switch a modulation system to be set to a receiver by a first control signal, and also switch another wireless communication device by transmitting a second control signal to the another wireless communication device through a transmitter.

In addition, at least part of functions of each section constituting the wireless communication device according to the example described above can be realized by using hardware, such as a processor (CPU) that is operated under program control, and a semiconductor memory (ROM/RAM) that has a storage area for storing a control program, control data, and the like. In this case, constituent elements such as a processor and a memory are included in the scope of the present invention.

In addition, in case part of functions of each section that constitutes the wireless communication device of the example described above is realized by using a program code, such a program code and a recording medium recording the program code are included in the scope of the present invention. When the program code in this case associates with an operating system and other application software and the like to realize the above function, program codes of these are also included.

In addition, hardware and software configurations of the receiving quality determination circuit (determining means) and the modulation system control section (modulation system switching means) of the example described above are not limited in particular. The modulation quality determination circuit and the modulation system control section may constitute circuits or units independently, or may be constituted in an integral manner in one circuit or unit, as long as each function can be realized. Alternatively, the receiving quality determination circuit and the modulation system control section may be configured in an integral manner in a receiver or a transmitter.

While the invention has been particularly shown and described with reference to the examples thereof, the invention is not limited to these examples. It will be understood by those of ordinary skill in the art that various changes in form and details may be made therein without departing from the spirit and scope of the present invention as defined by the claims.

INDUSTRIAL APPLICABILITY

The present invention can also be applied for the purpose of the wireless communication device that uses an adaptive modulation system in which a modulation system is selected and switched in accordance with quality of a channel.

The invention claimed is:

1. A wireless communication device, comprising:
a transmitter that converts data into a modulation wave based on a set modulation system and transmits the modulation wave;
a receiver that receives a transmitted modulation wave, and converts the modulation wave into original data based on the set modulation system;
a determination circuit that determines quality of a channel on the basis of a signal received by the receiver; and
a control section that switches the set modulation system to a temporal modulation system that is strongest against external disturbance among a plurality of different modulation systems set in advance, when the determination circuit detects a beginning of deterioration in quality of the channel, and then switches the temporal modulation system to a modulation system in accordance with quality of the channel.

2. The wireless communication device according to claim 1, wherein
the control section switches the modulation system to a modulation system with a smallest modulation multi-level number as the temporal modulation system that is strongest against external disturbance.

3. The wireless communication device according to claim 1, wherein
the control section switches the modulation system to a modulation system with a narrowest transmission band as the temporal modulation system that is strongest against external disturbance.

4. The wireless communication device according to claim 1, wherein
the control section switches the modulation system to a modulation system with a smallest modulation multi-level number and a narrowest transmission band as the temporal modulation system that is strongest against external disturbance.

5. The wireless communication device according to claim 1, wherein
the control section switches a modulation system set to the receiver by a first control signal, and also switches a modulation system of another wireless communication device by transmitting a second control signal to the another wireless communication device through the transmitter.

6. A modulation system switching method of a wireless communication device that includes a transmitter that converts data into a modulation wave based on a set modulation system and transmits the modulation wave, and a receiver that receives a transmitted modulation wave, and converts the modulation wave into original data based on the set modulation system, the method comprising:

a determining step of determining quality of a channel on the basis of a signal received by the receiver; and a modulation system switching step of switching the set modulation system to a temporal modulation system that is strongest against external disturbance among a plurality of different modulation systems set in advance, when the determining step detects a beginning of deterioration in quality of the channel, and then switching the temporal modulation system to a modulation system in accordance with quality of the channel.

7. The modulation system switching method according to claim 6, characterized in that the modulation system switching step switches the modulation system to a modulation system with a smallest modulation multi-level number as the temporal modulation system that is strongest against external disturbance.

8. The modulation system switching method according to claim 6, wherein the modulation system switching step switches the modulation system to a modulation system with a narrowest transmission band as the temporal modulation system that is strongest against external disturbance.

9. The modulation system switching method according to claim 6, wherein the modulation system switching step switches the modulation system to a modulation system with a smallest modulation multi-level number and a narrowest transmission band as the modulation system that is strongest against external disturbance.

10. The modulation system switching method according to claim 6, wherein the modulation system switching step switches a modulation system set to the receiver by a first control signal, and also switches a modulation system of another wireless communication device by transmitting a second control signal to the another wireless communication device through the transmitter.

11. A wireless communication device, comprising:

a transmitter that converts data into a modulation wave based on a set modulation system and transmits the modulation wave;

a receiver that receives a transmitted modulation wave, and converts the modulation wave into original data based on the set modulation system;

determining means for determining quality of a channel on the basis of a signal received by the receiver; and modulation system switching means for switching the set modulation system to a temporal modulation system that is strongest against external disturbance among a plurality of different modulation systems set in advance, when the determining means detects a beginning of deterioration in quality of the channel, and then switching the temporal modulation system to a modulation system in accordance with quality of the channel.

12. The wireless communication device according to claim 11, wherein the modulation system switching means switches the modulation system to a modulation system with a smallest modulation multi-level number as the temporal modulation system that is strongest against external disturbance.

13. The wireless communication device according to claim 11, wherein the modulation system switching means switches the modulation system to a modulation system with a narrowest transmission band as the temporal modulation system that is strongest against external disturbance.

14. The wireless communication device according to claim 11, wherein the modulation system switching means switches the modulation system to a modulation system with a smallest modulation multi-level number and a narrowest transmission band as the temporal modulation system that is strongest against external disturbance.

15. The wireless communication device according to claim 11, wherein the modulation system switching means switches a modulation system set to the receiver by a first control signal, and also switches a modulation system of another wireless communication device by transmitting a second control signal to the another wireless communication device through the transmitter.

* * * * *